(12) United States Patent
Rozitis et al.

(10) Patent No.: US 7,957,072 B2
(45) Date of Patent: Jun. 7, 2011

(54) METHOD AND APPARATUS FOR MOVING A COMPONENT IN AN OPTICAL SIGHT

(75) Inventors: Peter A. Rozitis, Midland (CA); Brien D. Ross, Wyevale (CA)

(73) Assignee: Raytheon Company, Waltham, MA (US)

( * ) Notice: Subject to any disclaimer, the term of this patent is extended or adjusted under 35 U.S.C. 154(b) by 4 days.

(21) Appl. No.: 12/546,046

(22) Filed: Aug. 24, 2009

(65) Prior Publication Data
US 2011/0043928 A1 Feb. 24, 2011

(51) Int. Cl.
*G02B 15/14* (2006.01)
(52) U.S. Cl. .......... 359/694; 359/699; 359/700
(58) Field of Classification Search .......... 359/694–701, 359/811–823
See application file for complete search history.

(56) References Cited

U.S. PATENT DOCUMENTS

| | | | | |
|---|---|---|---|---|
| 5,884,884 A | * | 3/1999 | Sauter | 248/314 |
| 7,411,750 B2 | * | 8/2008 | Pai | 359/822 |

* cited by examiner

*Primary Examiner* — Mohammed Hasan
(74) *Attorney, Agent, or Firm* — Haynes and Boone LLP

(57) ABSTRACT

A method and apparatus relate to an optical sight having a first section, and having a second section that is movable relative to the first section, and that has optics thereon. One aspect involves: preventing movement of the second section away from a first position past a second position; responding to movement of a member relative to the first section from a third position to a fourth position by moving the second section from the first position to the second position; resiliently urging the second section away from the first position and past the second position when the member is on a side of the fourth position remote from the third position; and releasably retaining the member in a position on a side of the fourth position remote from the third position.

18 Claims, 11 Drawing Sheets

METHOD AND APPARATUS FOR MOVING A COMPONENT IN AN OPTICAL SIGHT

FIELD OF THE INVENTION

This invention relates in general to optical sights and, more particularly, to optical sights that have a movable component.

BACKGROUND

Over the years, various techniques and devices have been developed to help a person accurately aim a firearm such as a rifle or a target pistol. One common approach is to mount on the barrel of the firearm a sight or scope, through which a person views the intended target in association with a reticle, often with a degree of magnification. In this regard, firearm sights sometimes include a tumbler having optics thereon, the tumbler being movable between two different positions in which the sight provides different levels of magnification of an image viewed by the person using the sight. Although existing firearm sights of this type have been generally adequate for their indented purposes, they have not been satisfactory in all respects.

As one aspect of this, it is common to provide one or more adjustments for the position of the movable tumbler, to effect calibration that aligns the optics on the tumbler with other optics within the sight. For example, there may be a tilt adjustment and/or an elevation adjustment for the tumbler. Existing arrangements for adjusting the position of a movable tumbler tend to involve a significant number of parts, as a result of which they are more expensive and less compact than would be desirable.

As another aspect, a manually-operable mechanism is normally provided to move the tumbler between its operational positions. In pre-existing mechanisms, inadvertent manual contact or a physical shock could cause the mechanism to effect an unintended release that permits the tumbler to move away from a selected position, sometimes to an intermediate position that is not a valid operational position of the tumbler and that effectively renders the sight optically non-operational. In a combat situation, it can be potentially dangerous for a soldier using the weapon if an unexpected movement of the tumbler either changes the magnification to a setting that is not currently useful, or renders the sight optically non-operational. A further consideration is that pre-existing mechanisms tend to be physically larger than desirable, and are integrated into the sight in a manner making it difficult to assemble the sight during production, and/or to disassemble and reassemble the sight if repairs are needed.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
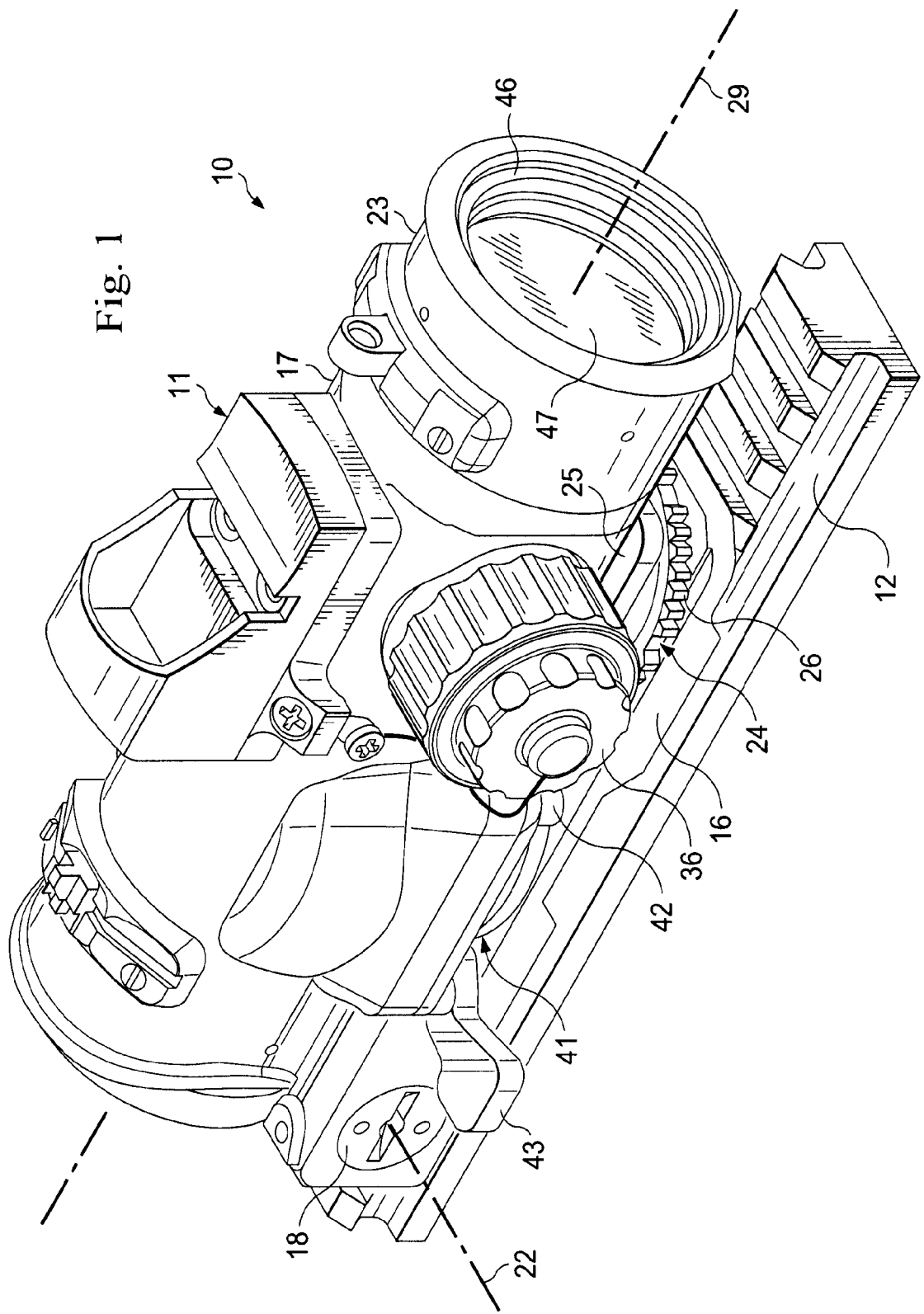
FIG. 1 is a diagrammatic perspective view showing an apparatus that includes a conventional mounting rail typically provided on a weapon such as a firearm, and an optical sight that is supported on the mounting rail and that embodies aspects of the invention.
Figure 2:
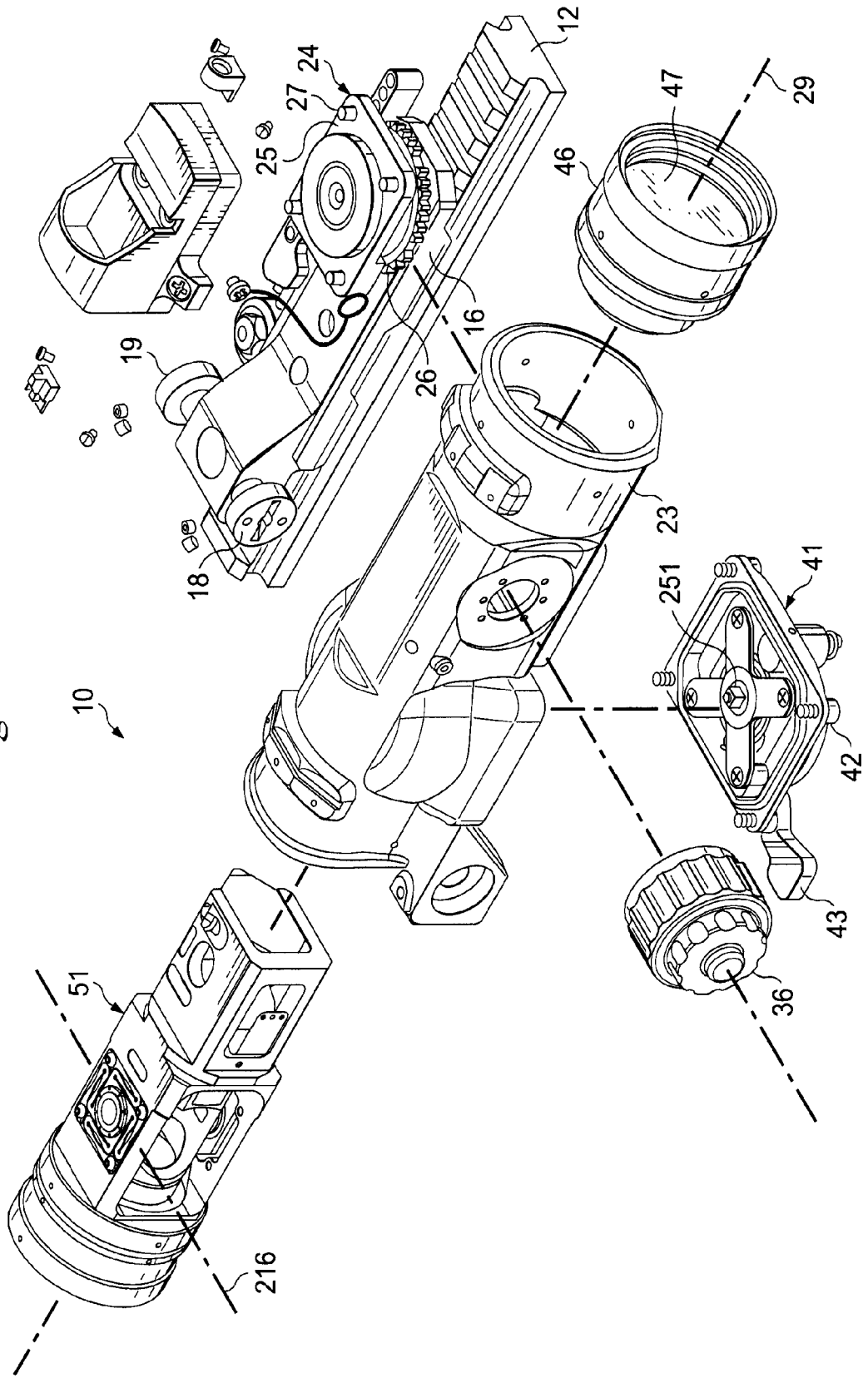
FIG. 2 is a diagrammatic exploded perspective view of the apparatus of FIG. 1.

FIG. 1 is a diagrammatic perspective view showing an apparatus 10 that includes a conventional mounting rail 12 typically provided on a weapon such as a firearm, and an optical sight 11 that is supported on the mounting rail 12, and that embodies aspects of the invention. FIG. 2 is a diagrammatic exploded perspective view of the apparatus 10 of FIG. 1. The drawings and the following description do not illustrate and describe in detail all aspects of the optical sight 11. Instead, the sight 11 is depicted and described to the extent necessary to facilitate a clear understanding of relevant aspects of the present invention.

With reference to FIGS. 1 and 2, a not-illustrated weapon has a conventional mounting rail 12 fixedly secured thereon. The rail 12 has a plurality of transversely extending slots in its upper side. The optical sight 11 includes a base 16, and the underside of the base has one or more transverse ribs that are not visible in FIG. 1, but that each engage a respective one of the slots in the rail 12. To attach the base 16 to the rail 12, the base is moved downwardly toward the rail until the ribs on the base each engage a respective slot in the rail. Then the base 16 is releasably and fixedly secured to the rail 12 in this position by actuating a known locking mechanism that is part of the sight 11 but that is not visible in the drawings.

The optical sight 11 includes an optics unit 17 that is supported on the base 16 for pivotal movement about a transverse horizontal axis 22 by two coaxial pivot bolts 18 and 19. The optics unit 17 includes a tubular outer housing 23 that has a central longitudinal opening therethrough, and that has spaced portions at one end cooperating with the pivot bolts 18 and 19 to effect the pivotal support of the optics unit 17 on the base 16.

At an end of the base 16 remote from the pivot bolts 18 and 19, an elevation adjusting mechanism 24 is mounted on top of the base 16. The elevation adjusting mechanism 24 is conventional, and therefore described here only briefly. The elevation adjusting mechanism 24 has a horizontal plate 25 near its upper end, and has a knurled thumbwheel 26 that is disposed between the plate 25 and the base 16, and that is supported for rotation about a vertical axis. In response to manual rotation of the thumbwheel 26, the mechanism 24 causes the plate 25 to move vertically up or down with respect to the base 16, in a known manner.

The plate 25 is fixedly secured to the underside of the outer housing 23 by four screws 27. Thus, in response to manual rotation of the thumbwheel 26, the plate 25 moves up or down, thereby pivoting the outer housing 23 and the optics unit 17 about the pivot bolts 18 and 19 with respect to the base 16. This pivotal movement adjusts the orientation of the optical axis 29 of the optics unit 17 with respect to the base 16 and thus with respect to the boresight of the not-illustrated weapon having the rail 12 upon which the optical sight 11 is mounted. A person using the sight 11 to aim the weapon looks through the sight along the optical axis 29, in a direction from right to left in FIGS. 1 and 2.

A manually-operable knob 36 is supported on one side of the outer housing 23 of the optics unit 17 for rotation about a horizontal axis. The knob 36 controls some electrical circuitry provided within the optics unit 17, for example to control the intensity of illumination provided to a reticle. The details of this electrical circuitry are not necessary to an understanding of the present invention, and the electrical circuitry is therefore not shown and described here in detail.

A magnification control module 41 is fixedly and detachably secured to the underside of the outer housing 23 by four screws 42. The module 41 has a movable lever 43 that can be manually operated. Manual movement of the lever 43 changes the degree of magnification provided by optics within the sight 11, in a manner discussed in more detail later. In the disclosed embodiment, reciprocal movement of the lever 43 changes the degree of magnification between 1× and 4×. However, it would alternatively be possible to use other degrees of magnification, or to adjust an optical characteristic other than magnification. The structure and operation of the magnification control module 41 are discussed in more detail later.

An eyepiece optics unit 46 is removably mounted within the outer housing 23 at a rear end thereof nearest the elevation control mechanism 24. The eyepiece optics unit 46 includes a known configuration of eyepiece lenses, one of which is visible at 47 in FIGS. 1 and 2.

Figure 3:
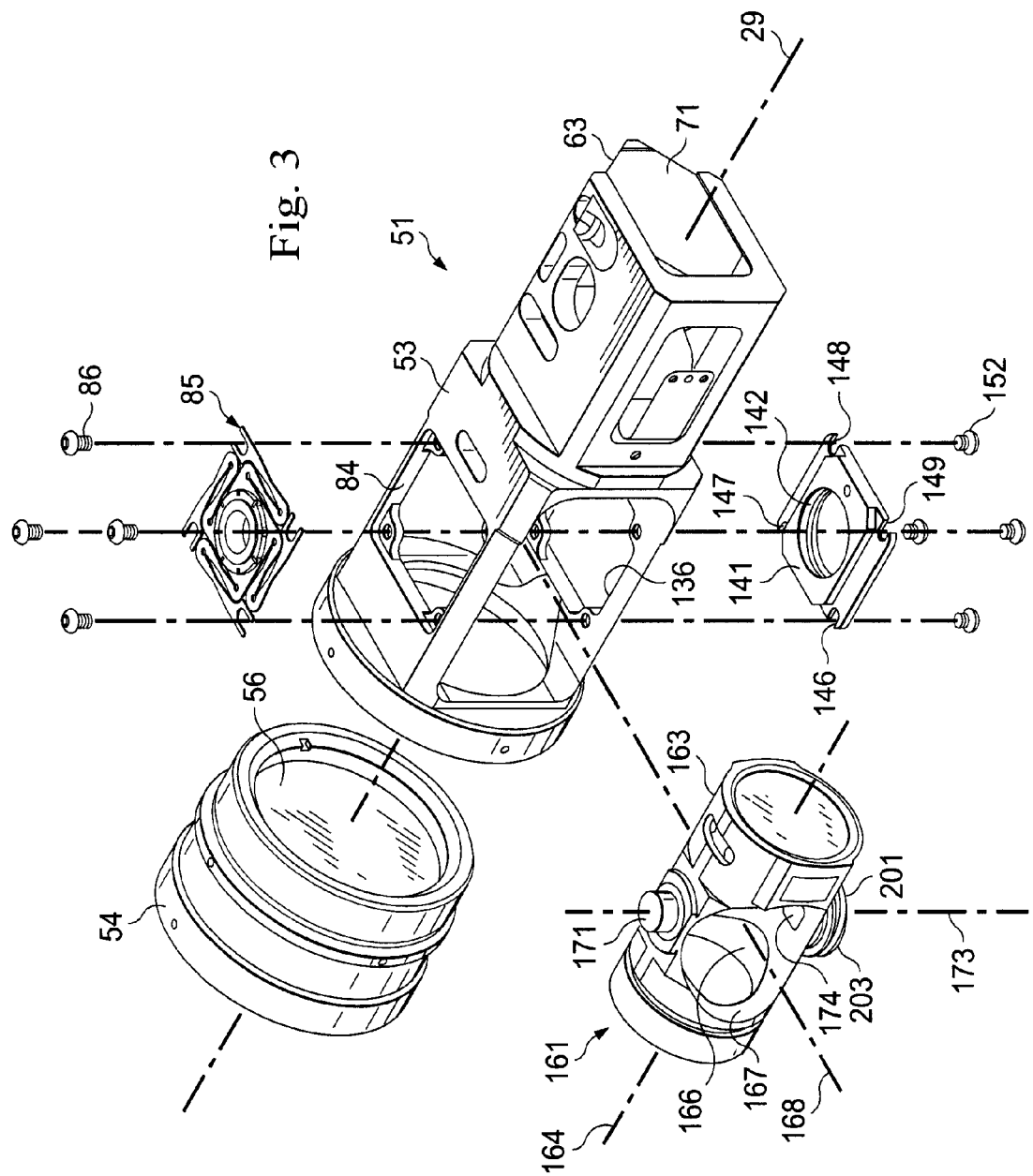
FIG. 3 is a diagrammatic, partially-exploded perspective view of a cartridge that is a component of the optical sight of FIG. 1.
Figure 4:
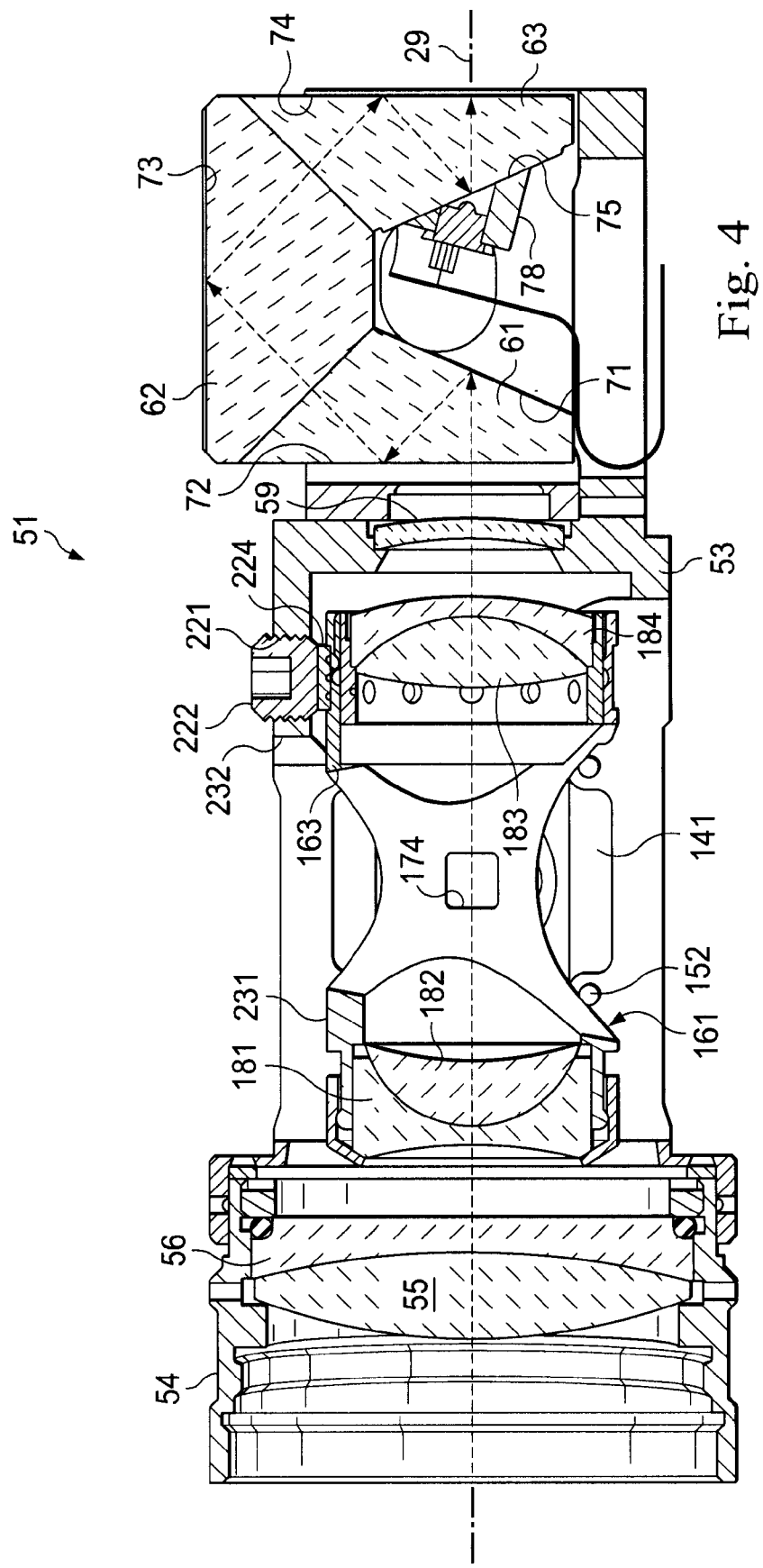
FIG. 4 is a diagrammatic central sectional top view of the cartridge of FIG. 3.

As best seen in FIG. 2, the optics unit 17 includes a cartridge 51 that is removably installed within the outer housing 23. FIG. 3 is a diagrammatic, partially-exploded perspective view of the cartridge 51. FIG. 4 is a diagrammatic central sectional top view of the cartridge 51. The cartridge 51 includes a cartridge frame 53, and an object optics unit 54 that is detachably coupled to one end of the frame 53 by a commercially-available adhesive. As best seen in FIG. 4, the object optics unit 54 includes an object lens doublet 55 and 56. An intermediate portion of the frame 53 supports a further lens 59. The optical axis 29 extends through each of the lenses 55, 56 and 59.

Three prisms 61, 62 and 63 are fixedly supported on the cartridge frame 53, at an end thereof remote from the object optics unit 54. Radiation traveling along the optical axis 29 is successively reflected at five prism surfaces 71, 72, 73, 74 and 75 that each have thereon a reflective coating that is not separately illustrated. A subassembly 78 is supported adjacent the prism surface 75, and superimposes an illuminated reticle onto radiation that is passing through the prism 63 of the optical sight along the optical axis 29. In the disclosed embodiment, the prisms 61-63 and the subassembly 78 have a configuration that is known in the art, and that is disclosed in U.S. Patent Application Publication No. 2005/0200965. The prisms 61-63 and subassembly 78 are therefore not described in further detail here. Alternatively, however, it would be possible to use some other suitable optical configuration in place of the prisms 61-63 and the subassembly 78.

With reference to FIG. 3, the cartridge frame 53 has a horizontal top wall with an approximately square hole 84 extending vertically therethrough. A flexure assembly 85 is disposed within the opening 84, and is fixedly secured there by four screws 86 that engage respective threaded openings provided in the cartridge frame 53.

Figure 5:
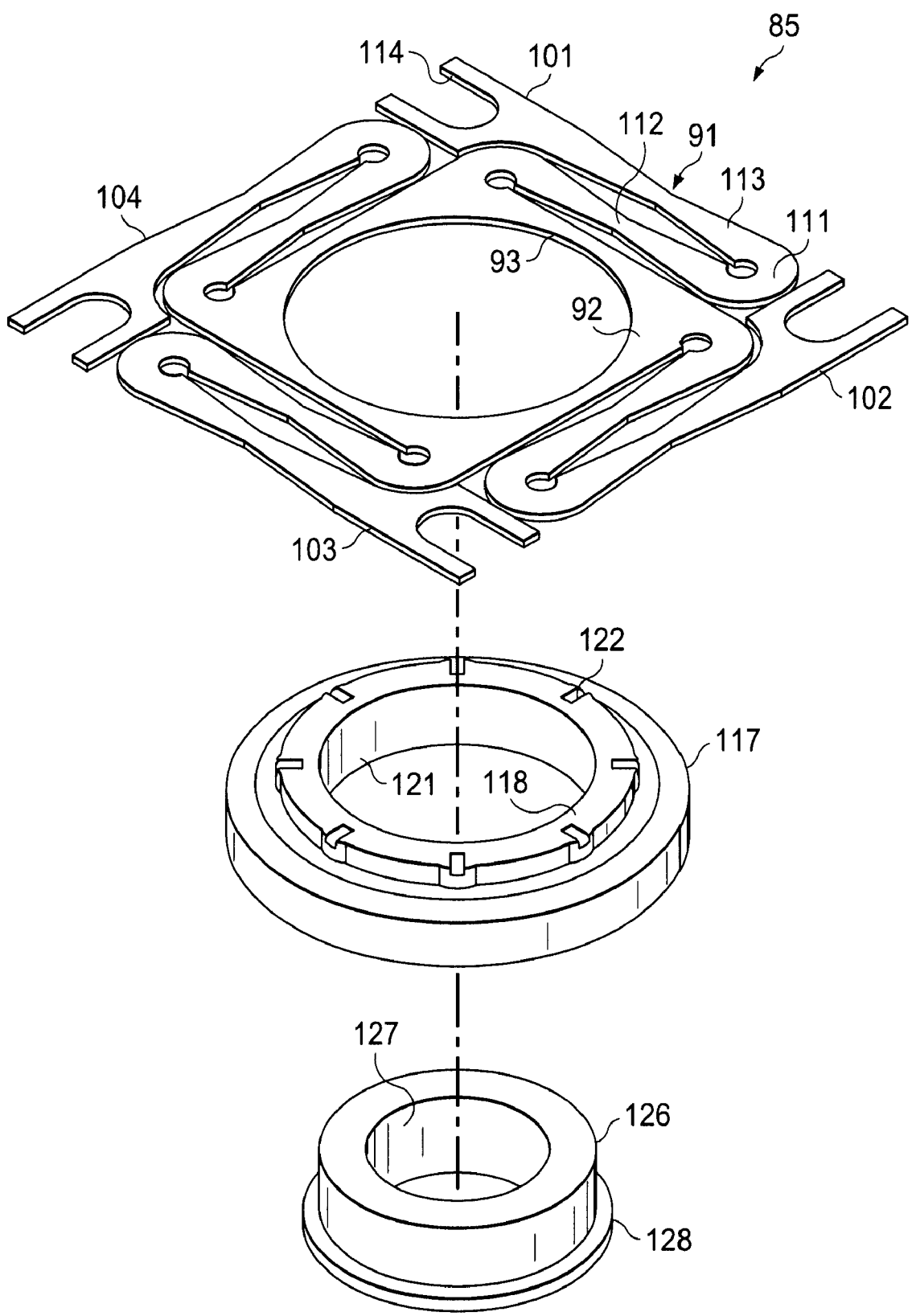
FIG. 5 is a diagrammatic exploded perspective view of a flexure assembly that is a component of the cartridge of FIG. 3.

FIG. 5 is a diagrammatic exploded perspective view of the flexure assembly 85. The flexure assembly 85 includes a flexure 91 that is a platelike piece of resilient material. In the disclosed embodiment, the flexure 91 is stamped from a plate of spring steel, or from a plate of stainless steel. However, it could alternatively be made from any other suitable material. The flexure 91 has a central portion or base 92 that has an approximately square perimeter, and that has a cylindrical opening 93 extending vertically through the center thereof. The flexure 91 also includes four U-shaped flexible arms 101-104 that are each fixedly coupled at one end to a respective corner of the square base 92, and that each effectively function as a leaf spring. The arms 101-104 are all identical, and therefore only the arm 101 is described here in detail.

More specifically, the U-shaped arm 101 has a bight 111, and two legs 112 and 113 that extend outwardly from opposite ends of the bight. The legs 112 and 113 extend approximately parallel to each other, and each extend approximately parallel to the nearest edge of the square base 92. The leg 112 is fixedly coupled at its outer end to one corner of the square base 92. The outer end of the other leg 113 has a slot 114, and one of the screws 86 (FIG. 3) extends through the slot 114 in order to fixedly secure the outer end of leg 113 to the cartridge frame 53. Although the peripheral edge of the base 92 defines approximately a square in the disclosed embodiment, it could alternatively be a different regular polygon with a larger or smaller number of sides, and with a correspondingly larger or smaller number of U-shaped arms each coupled to a respective corner. As still another alternative, the base 92 could have a peripheral edge with a shape other than that of a regular polygon, and/or the arms 101-104 could each have a different shape, provided the arms have an appropriate degree of flexibility.

The flexure assembly 85 also includes a ring 117 with an annular flange 118 projecting upwardly from a top surface 119 thereof. A cylindrical opening 121 extends vertically through the center of the ring 117. The annular flange 118 has an outside diameter approximately equal to the inside diameter of the opening 93 in the flexure 91. The opening 93 receives the annular flange 118 with a friction fit, such that the top surface 119 of the ring 117 engages a bottom surface of the base 92 of the flexure 91. After the annular flange 118 has been press-fit into the opening 93, several angularly-spaced crimps 122 are created in the upper, outer edge of the annular flange 118, in order to prevent separation of the flexure 91 and ring 117.

The flexure assembly 85 also includes a ball bearing 126. Although not shown in detail in the drawings, the ball bearing 126 has a standard internal construction that includes two concentric annular races with a plurality of spherical balls between them. The ball bearing 126 has an outside diameter that is approximately equal to the inside diameter of the cylindrical opening 121 through the ring 117, and the ball bearing 126 is snugly press-fit within the opening 121. The ring 117 thus serves as a holder for the ball bearing 126. The ball bearing 126 has a radially outwardly projecting annular flange 128 at the lower end thereof, which engages a bottom surface of the ring 117 and prevents the ball bearing 126 from moving upwardly relative to the ring 117. The ball bearing 126 has a cylindrical opening 127 extending vertically therethrough.

Referring again to FIG. 3, the cartridge frame 53 has a bottom wall with an approximately square opening 136 extending vertically therethrough, in alignment with the opening 84. An approximately square adjusting plate 141 is disposed within the opening 136. In a direction parallel to optical axis 29, the plate 141 has a length that is somewhat shorter than the length of the opening 136 in that direction, so that the position of the plate within the opening can be adjusted in directions parallel to the optical axis. The plate 141 has a width that is slightly smaller than the width of the opening 136, so that the plate is held against any significant movement within the opening 136 in directions transverse to the optical axis 29. The plate 141 has a threaded cylindrical opening 142 extending vertically through the center thereof.

The four corners of the plate 141 have respective slots 146-149 that each extend parallel to the optical axis 29. Four screws 152 each extend through a respective one of the slots 146-149, and each engage a respective threaded opening provided in the cartridge frame 53. When the screws 152 are not fully tightened, the plate 141 is capable of limited sliding movement within the opening 136 in directions parallel through the optical axis 29, while the screws 152 slide within the slots 146-149. The screws 152 can be tightened in order to fixedly secure the plate 141 in any selected position with respect to the frame 53.

Figure 6:
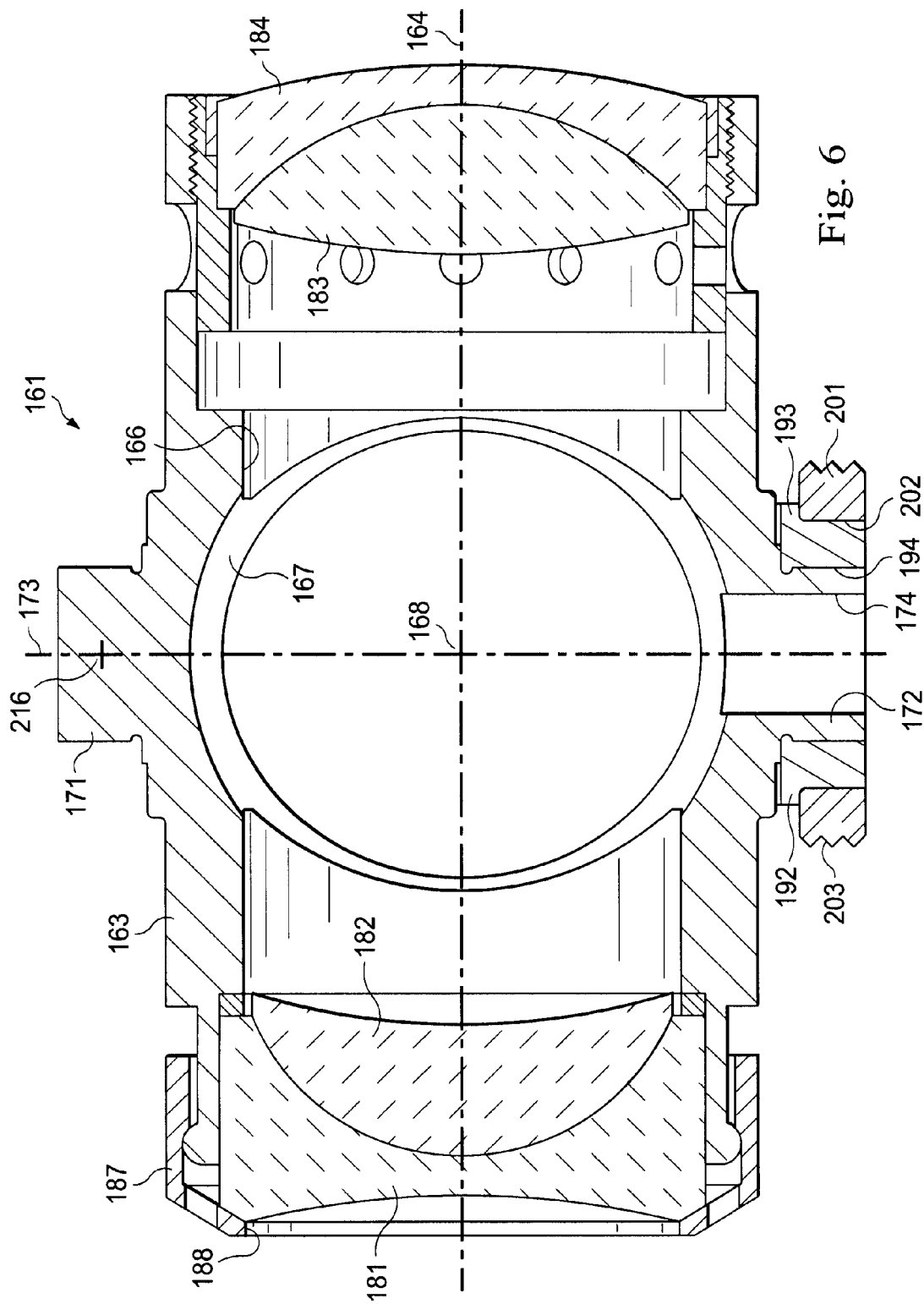
FIG. 6 is a diagrammatic central sectional side view of a tumbler assembly that is a component of the cartridge of FIG. 3.

As shown in FIG. 3, the cartridge 51 includes a movable tumbler assembly 161. FIG. 6 is a diagrammatic central sectional side view of the tumbler assembly 161. With reference FIGS. 3 and 6, the tumbler assembly 161 includes a generally cylindrical housing 163 that is approximately concentric to a horizontal axis 164. A roughly cylindrical opening 166 extends lengthwise through the housing 163, approximately concentric to the axis 164. An opening 167 of roughly frustoconical shape extends transversely through the housing 163, approximately concentric to a further horizontal axis 168 that is perpendicular to and intersects the horizontal axis 164.

A cylindrical projection 171 extends upwardly from the top of the housing 163, and a further cylindrical projection 172 extends downwardly from the bottom of the housing. The cylindrical projections 171 and 172 are each coaxial with a vertical axis 173 that extends through the intersection of the horizontal axes 167 and 168. An opening or recess 174 with a square cross section extends upwardly into the cylindrical projection 172 from the bottom surface thereof. At its upper end, the recess 174 communicates with the openings 166 and 177 that extend through the housing 163. The vertical axis 173 extends approximately centrally through the recess 174.

With reference to FIG. 6, a lens doublet 181-182 is supported at one end of the housing 163 within the opening 166, and a further lens doublet 183-184 is supported at the opposite end of the housing 163 within the opening 166. The lenses 181-184 have a common optical axis that is coincident with the axis 164. A cap 187 is held with a snap fit on the housing 163 at the end thereof nearest the lens doublet 181-182, and has a circular opening 188 extending centrally and axially therethrough.

Still referring to FIG. 6, the tumbler assembly 161 includes a ball bearing 192 that, in the disclosed embodiment, is identical to the ball bearing 126 (FIG. 5). The ball bearing 192 has a radially-outwardly projecting annular flange 193 at its upper end. The ball bearing 192 has a central cylindrical opening 194 extending vertically therethrough, and the projection 172 of the tumbler housing 163 is press fit within the opening 194 through the ball bearing.

Figure 7:
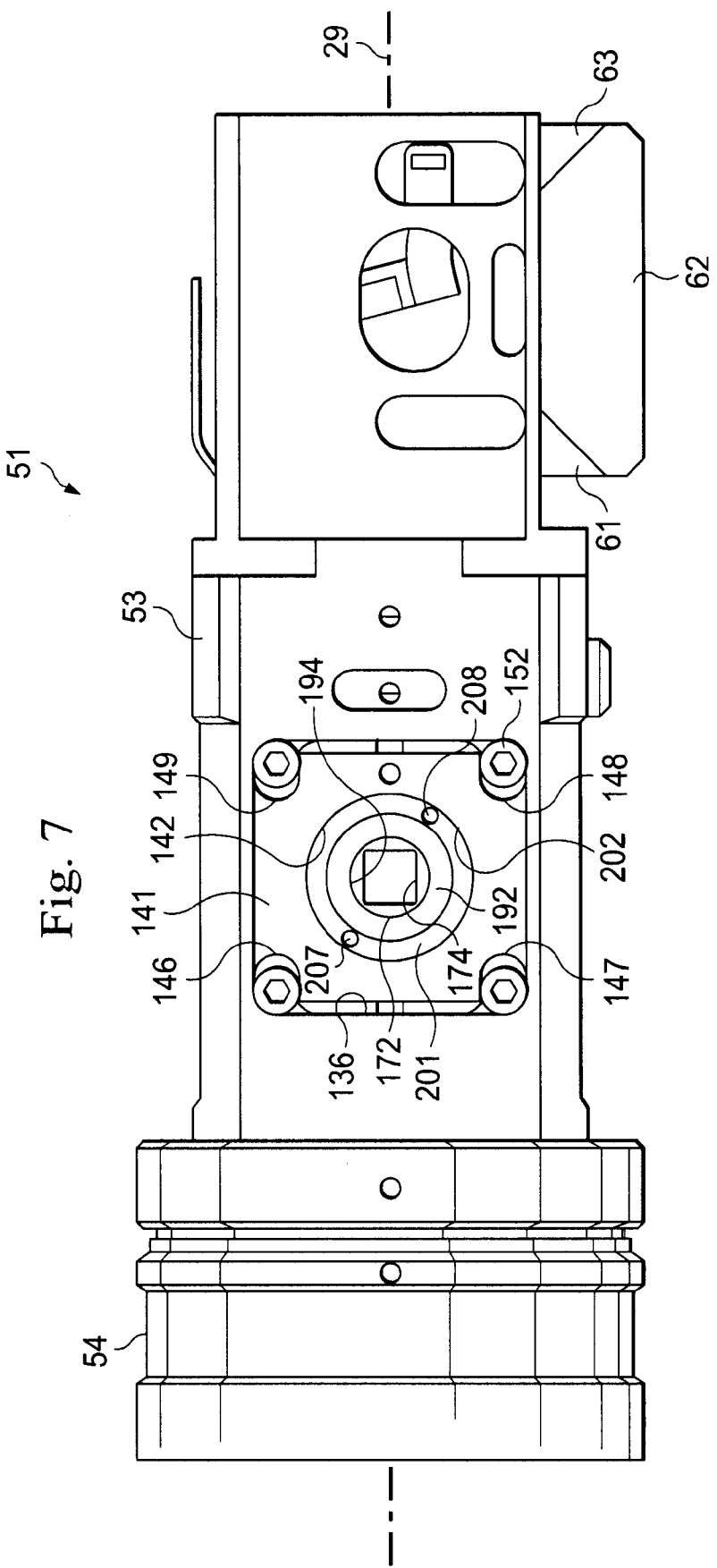
FIG. 7 is a diagrammatic bottom view of the cartridge of FIG. 3.

The tumbler assembly 161 further includes an adjusting ring 201 that has a central cylindrical opening 202 extending vertically therethrough. The ball bearing 192 is press fit within the opening 202, and the flange 193 prevents downward movement of the ball bearing relative to the adjusting ring 201. With reference to FIG. 3, the adjusting ring 201 is rotatably received within the opening 142 in the adjusting plate 141. The adjusting ring 201 has a radially-outwardly facing annular side surface 203 with threads thereon that engage the threads in the threaded opening 142. FIG. 7 is a diagrammatic bottom view of the cartridge 51. As best seen in FIG. 7, the adjusting ring 201 has two vertical holes 207 and 208 therein on diametrically opposite sides thereof. The holes 207 and 208 each extend vertically upwardly from the bottom of the ring 201. A not-illustrated tool has two spaced prongs that can each be inserted into a respective one of the holes 207 and 208, and the tool can then be used to rotate the adjusting ring 201 relative to the adjusting plate 141. Due to the cooperating threads on the ring 201 and plate 141, rotation of the ring within the plate causes the ring to move vertically upwardly or downwardly with respect to the plate, thereby adjusting the vertical position of the entire tumbler assembly 161 within the cartridge frame 53.

The cylindrical projection 171 on top of the tumbler housing 163 is press fit within the cylindrical opening 127 (FIG. 5) in the ball bearing 126 of the flexure assembly 85. When the adjusting ring 201 is rotated within the adjusting plate 141 in order to cause the tumbler assembly 161 to move upwardly or downwardly, the flexible arms 101-104 of the flexure 91 resiliently flex to accommodate this movement, while also yieldably urging the tumbler assembly 161 to move back toward a neutral or target position in which the arms of the flexure are not tensioned.

As also discussed above, if the screws 152 are loosened slightly, the adjusting plate 141 (FIGS. 3 and 7) is capable of a limited amount of movement relative to the cartridge frame 53 in directions parallel to the optical axis 29. This movement of the adjusting plate 141 moves the cylindrical projection 172 at the bottom of the tumbler assembly 161 a small distance forwardly or rearwardly with respect to the cartridge frame 53, while the projection 171 at the top of the tumbler housing stays in approximately the same place. Thus, the entire tumbler assembly 161 can be tilted about a transverse horizontal axis 216 (FIGS. 3 and 6) that extends through the projection 171. The arms 101-104 of the flexure 91 resiliently flex to the extent necessary to accommodate this pivotal movement about axis 216, while resiliently urging the tumbler assembly 161 to pivot back to the neutral position in which the flexure 91 is not tensioned.

Assisted by the ball bearings 126 and 192 (FIGS. 5 and 6), the tumbler housing 163 with the lenses 181-184 therein can pivot about the vertical axis 173 (FIG. 6) through a range of approximately 90° with respect to the cartridge frame 53, the flexure assembly 85, and the adjusting plate 141. FIG. 4 shows one operational position of the tumbler assembly 161 relative to the cartridge frame 53. The cartridge frame 53 has a side wall with a threaded opening 221 therethrough, and a limit setscrew 223 is disposed in the opening 221. A stop plate 224 made of plastic or some other suitable material is fixedly adhesively secured to a side surface of the tumbler housing 163, and engages the inner end of the setscrew 222 in the operational position of the tumbler assembly 161 shown in FIG. 4.

When the tumbler assembly 161 is in the operational position of FIG. 4, the optical axis 164 (FIGS. 3 and 6) of the lenses 181-184 in the tumbler assembly 161 should be coincident with the optical axis 29 of the sight. In order to achieve this alignment, the adjusting ring 201 (FIGS. 3 and 6) can be rotated in order to move the entire tumbler assembly 161 up and down, and the adjusting plate 141 can be moved forward or backward to adjust the tilt of the tumbler assembly 161 about axis 216. Further, the setscrew 222 (FIG. 4) can be rotated to adjust the pivotal position of the tumbler assembly 161 about the vertical axis 173. In response to rotation of the ring 201 or movement of the adjusting plate 141, the flexure 91 resiliently flexes to the extent necessary to accommodate the adjustment. The flexure 91 is extremely compact, but resiliently accommodates several different degrees of freedom in the adjusting movement of the tumbler assembly 161. These adjustments of the tumbler assembly 161 are typically made at the factory during assembly and test of the sight 11, and should not normally need to be adjusted again later in the field.

Figure 8:
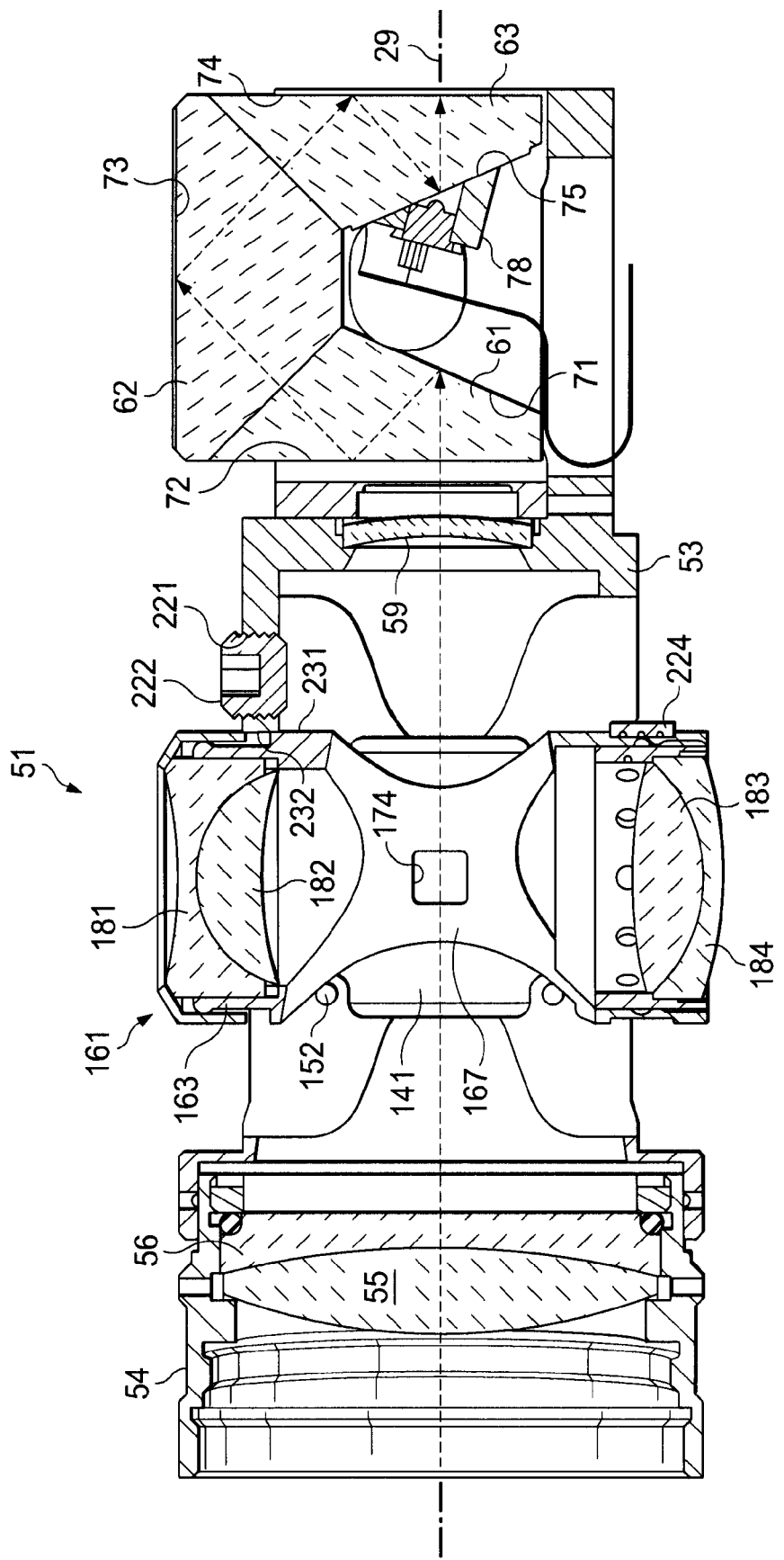
FIG. 8 is a diagrammatic central sectional top view of the cartridge that is similar to FIG. 4, but that shows a different operational position of the tumbler assembly.

FIG. 8 is a diagrammatic central sectional top view of the cartridge 51 that is similar to FIG. 4, but that shows a different operational position of the tumbler assembly 161. More specifically, in FIG. 8, the tumbler assembly 161 has been rotated approximately 90° clockwise from the position shown in FIG. 4, until a surface 231 on the tumbler housing 163 engages a limit surface 232 on the cartridge frame 53. In this operational position of the tumbler assembly 161, the optical axis 29 extends through the frustoconical opening 167 in the tumbler housing 163, and the lenses 181-184 in the housing 163 are all spaced radially from the optical axis 29, so that radiation traveling along the optical axis 29 does not pass through any of the lenses 181-184.

In the operational position of the tumbler assembly 161 that is shown in FIG. 4, the lenses 181-184 of the tumbler assembly cause a 1× magnification of radiation traveling along the optical axis 29. In contrast, in the operational position shown in FIG. 8, radiation does not pass through the lenses 181-184, and thus the tumbler assembly exerts no influence on the magnification imparted to the radiation. In this position of the tumbler assembly 163, the sight 11 provides an effective magnification of 4×.

Referring again to FIG. 2, the magnification control module 41 will now be described in more detail. The magnification control module 41 includes an upwardly projecting protrusion 251 of square cross section that is rotatable about a vertical axis. The protrusion 251 is slidably removably received in the square recess 174 (FIG. 6) provided in the cylindrical projection 172 of the tumbler housing 163. The square cross-sectional size of the protrusion 251 is slightly smaller than the square cross-sectional size of the recess 174, in order to prevent significant relative rotation therebetween, while accommodating the small amount of forward or rearward movement of the projection 172 on the tumbler housing 163 that can result from forward or rearward adjustment of the adjusting plate 141 (FIG. 3). When the lever 43 is manually moved, it pivots the protrusion 251 in a manner described in more detail later. Due to the cooperating square cross sections of the protrusion 251 and the recess 174, pivotal movement of the protrusion 251 causes the tumbler assembly 161 to pivot between the two operational positions that are respectively shown in FIGS. 4 and 8.

Figure 9:
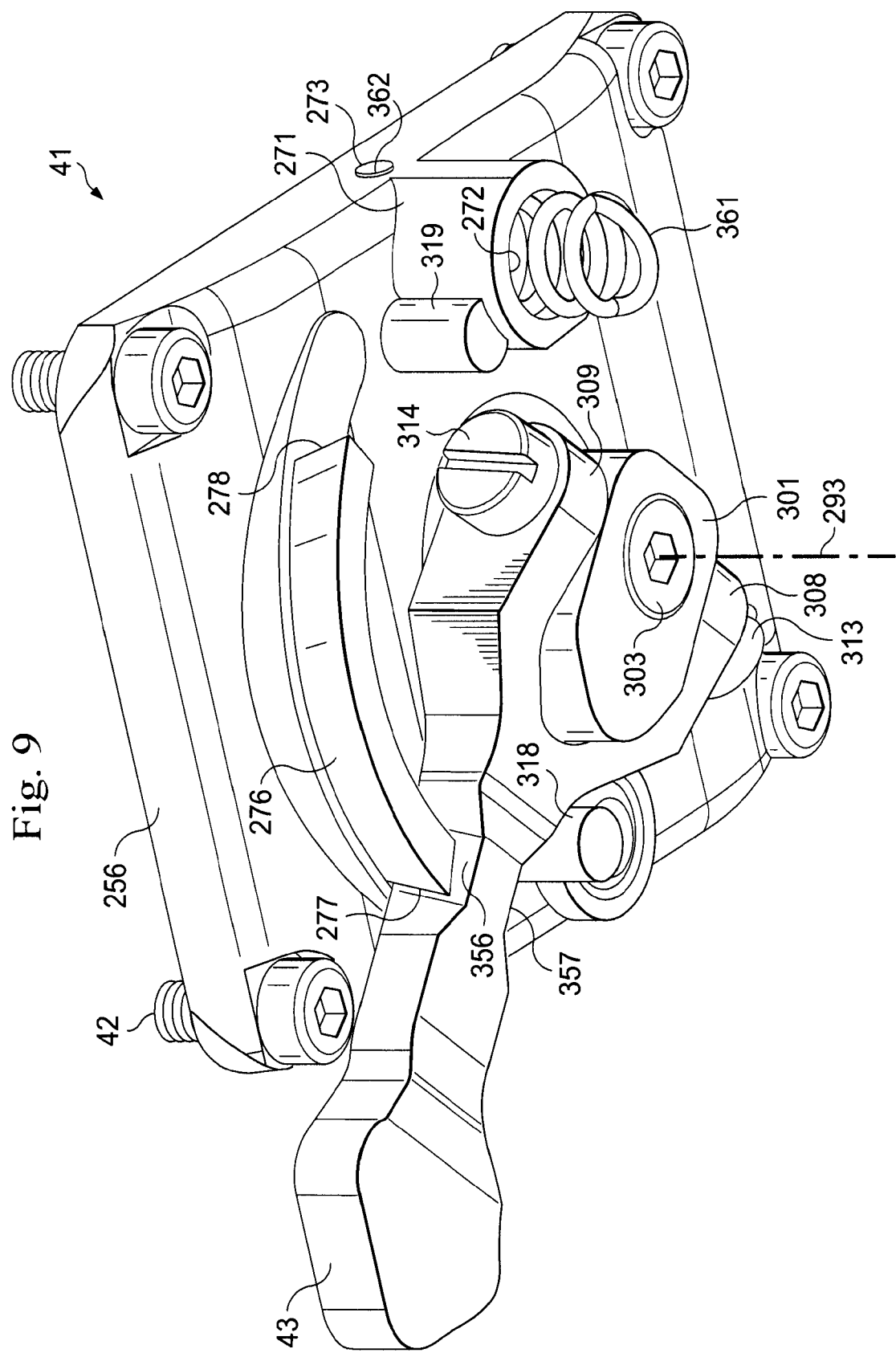
FIG. 9 is a diagrammatic perspective bottom view showing in a larger scale and from a different angle a magnification control module that is a component of the optical sight of FIGS. 1 and 2.
Figure 10:
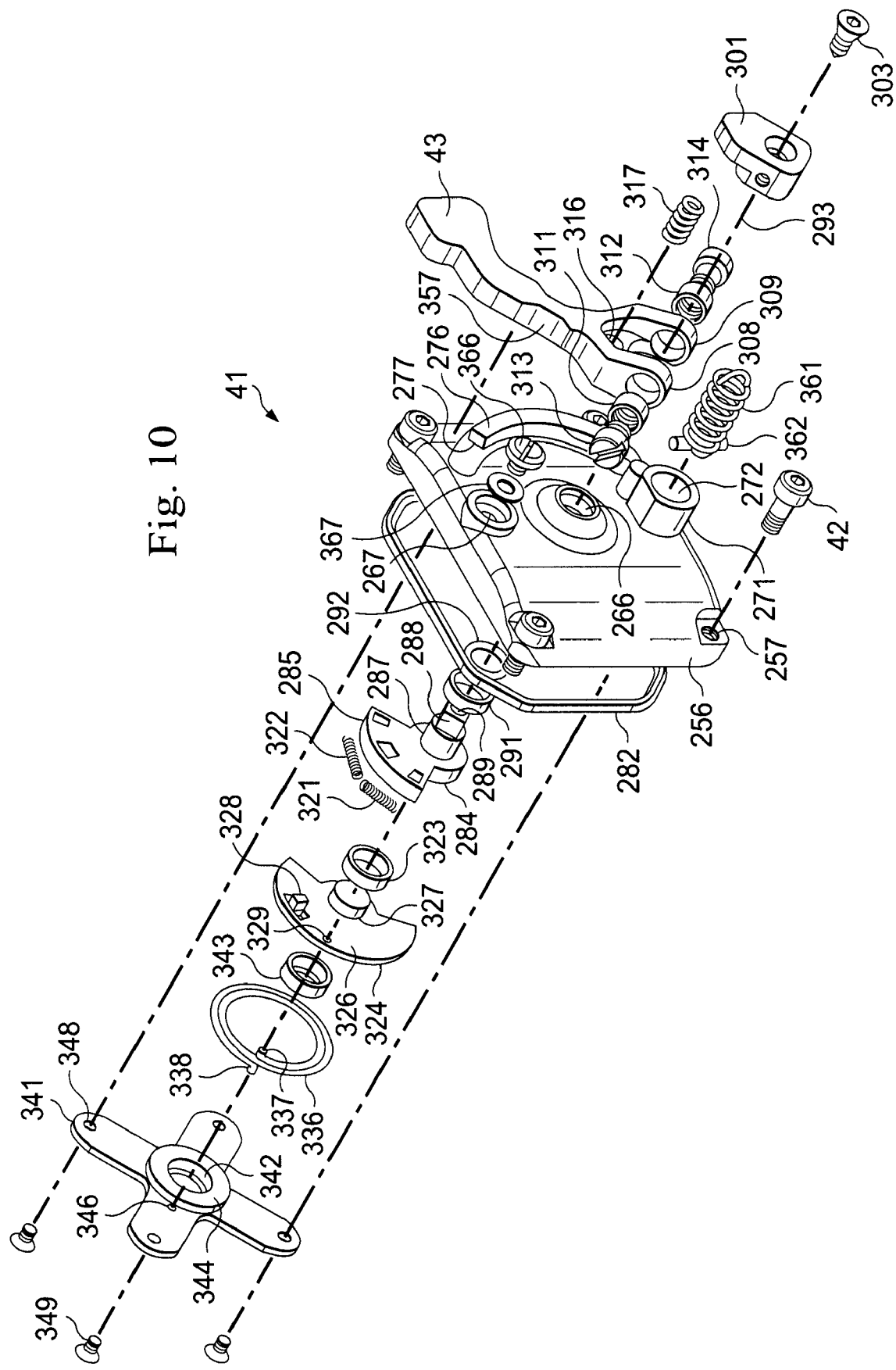
FIG. 10 is a diagrammatic exploded perspective bottom view of the magnification control module of FIG. 9.
Figure 11:
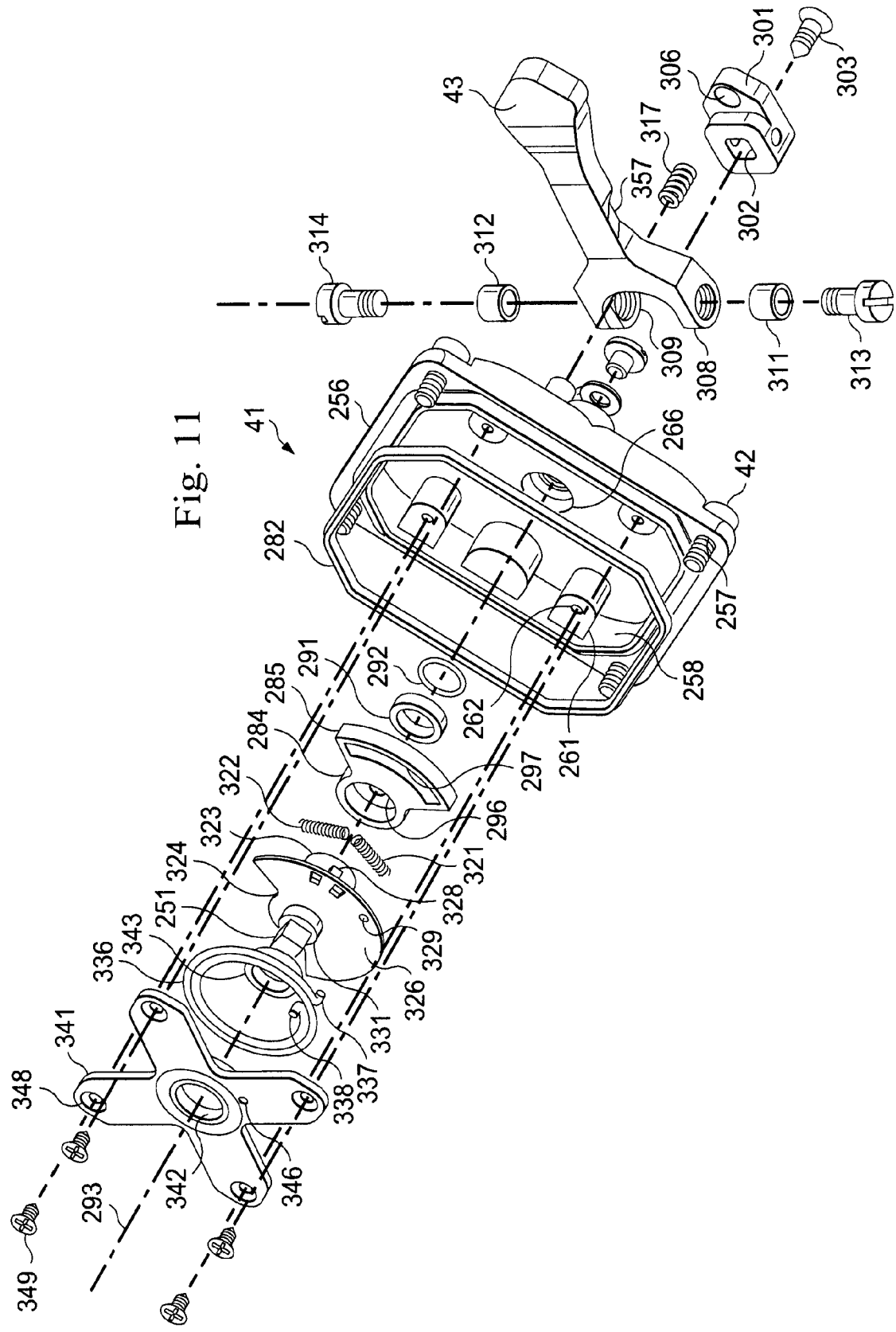
FIG. 11 is a diagrammatic exploded perspective top view of the magnification control module of FIG. 9.

FIG. 9 is a diagrammatic perspective bottom view of the magnification control module 41 of FIG. 2, showing this module in an enlarged scale, and from a different angle. FIG. 10 is a diagrammatic exploded perspective bottom view of the module 41, and FIG. 11 is a diagrammatic exploded perspective top view of the module 41. With reference to FIGS. 9-11, the module 41 includes a cover 256 of approximately square shape, with an opening 257 extending vertically therethrough near each corner. The screws 42 that then secure the module 41 to the outer housing 23 each extend through a respective one of the openings 257. A shallow and approximately square recess 258 opens downwardly into the cover 256 from the top side thereof. Four vertical posts 261 are provided at spaced locations within the recess 258, and a threaded opening 262 extends vertically downwardly into each of the posts 261.

A cylindrical opening 266 extends completely through the cover 256 at the center thereof, and thus communicates at its upper end with the recess 258. The cylindrical opening 266 has two portions of different diameter, with an axially-upwardly facing annular shoulder therebetween. A threaded vent opening 267 also extends completely vertically through the cover 256, at a location spaced radially outwardly from the opening 266. A projection 271 extends downwardly from the underside of the cover 256, and a blind cylindrical opening 272 extends vertically upwardly into the projection 271. A transverse cylindrical opening 273 extends horizontally into the cover 256 from a side surface thereof, and communicates with the upper end of the blind opening 272. An arcuate flange 276 projects downwardly from the underside of the cover 256, and is approximately concentric to the opening 266. The flange 276 has opposite end surfaces 277 and 278 that are inclined so they converge upwardly. A resiliently flexible O-ring 282 is provided between the cover 256 and the outer housing 23 (FIG. 2), in order to facilitate a fluid seal therebetween. The O-ring 282 is made from rubber or plastic, or from any other suitable material.

A spring holder 284 has a platelike sector-shaped main portion 285, a cylindrical projection 287 that extends downwardly from the main portion 285, a square post 288 that extends downwardly from the lower end of the projection 287, and a threaded hole 289 that extends upwardly into the post 288 from the lower end thereof. A bushing 291 and a resiliently flexibly O-ring 292 are each disposed within the opening 266 through the cover 256, with the O-ring against the annular shoulder, and the bushing just above the O-ring. The cylindrical projection 287 on the spring holder 284 extends through the bushing 291 and the O-ring 292, and is rotatable with respect to the cover 256 about a vertical pivot axis 293 that is coaxial with the opening 266 and the cylindrical projection 287. The O-ring 292 facilitates a fluid seal. The spring holder 284 has a cylindrical recess 296 in the upper side of the main portion 285, concentric to the pivot axis 293. The spring holder 284 also has an arcuate recess or grove 297 in the upper side of the main portion 285, concentric to the axis 293 but spaced radially outwardly from the recess 296.

A lever mount 301 has an upwardly-open square hole 302 that slidably and non-rotatably receives the square post 288 of the spring holder 284. A screw 303 extends through an opening in the lever mount 301 and engages the threaded hole 289 in the square post 288, in order to fixedly secure the lever mount 301 to the spring holder 284. The lever mount 301 has an upwardly-open cylindrical recess 306 therein at a location spaced radially outwardly from the square hole 302.

The lever 43 has a bifurcated inner end with two spaced portions 308 and 309 that are disposed on opposite sides of the lever mount 306. The spaced portions 308 and 309 each have a cylindrical horizontal hole therethrough with a bushing 311 or 312 disposed therein. Screws 313 and 314 extend through the respective bushings 311 and 312, and engage threaded openings provided in opposite sides of the lever mount 301, thereby supporting the lever 403 for limited pivotal movement on the lever mount 301. The lever 43 has a downwardly open cylindrical recess 316 (FIG. 10). A helical coil spring 317 has its lower end disposed in the recess 306, and has its upper end disposed in the recess 316. The spring 317 urges the lever 43 to pivot upwardly about the lever mount 301. The cover 256 has two downwardly-projecting posts 318 and 319 that are positioned to engage the lever 43 in order to limit pivotal movement of the lever about the vertical axis 293.

A bushing 323 is disposed within the cylindrical recess 296 in the spring holder 284. Two coil springs 321 and 322 are each disposed within the arcuate recess 297 in the spring holder 384, in an end-to-end relationship.

A drive part 324 includes a sector-shaped plate 326, and a cylindrical projection 327 that extends downwardly from the underside of the plate 326, coaxial with the pivot axis 293. The cylindrical projection 327 is rotatably received within the bushing 323. The plate 326 has, at a location spaced radially outwardly from the projection 327, a downwardly projecting tab 328 that is disposed within the arcuate recess 297 of the spring holder 284, between the adjacent ends of the two coil springs 321 and 322. The plate 326 has a small opening 329 extending vertically therethrough near a radially outer edge. The drive part 324 has a cylindrical projection 331 that extends upwardly from the plate 326, coaxial with the projection 327 and the pivot axis 293. The drive part also includes the previously-mentioned square protrusion 251, which projects upwardly from the cylindrical projection 331.

A coil spring 336 has one end 337 that is bent to extend downwardly, and an opposite end 338 that is bent to extend upwardly. The end 337 is received in the small opening 329 in the plate 326 of the drive part 324. An X-shaped retainer 341 has a cylindrical opening 342 extending vertically through the center thereof. A bushing 343 is disposed within the opening 342 with a press fit, and the cylindrical projection 331 on the drive part 324 is rotatably received within the bushing 343. The retainer 341 has a short cylindrical projection 344 on the underside thereof, and the coil spring 336 encircles the projection 344. The retainer 341 has a small vertical opening 346 near the projection 344, and the end portion 338 of the coil spring 336 is received within the opening 346. The retainer 341 has four legs that project radially outwardly in different directions, and the outer end of each leg has an opening 348 extending vertically therethrough. Four screws 349 each extend through a respective one of the openings 348, and engage the threaded opening 262 provided in a respective one of the posts 261 of the cover 256.

The coil springs 321 and 322 resiliently urge the tab 328 toward the center of the arcuate slot 297, and are sufficiently strong to keep the tab centered within the slot, except under certain specific conditions that are described later. The coil spring 336 continuously urges the drive part 324 and thus the spring holder 284 and lever 43 toward an operational position in which the tumbler assembly 161 is in the 4× position shown in FIG. 8. Alternatively, however, it would be possible for the coil spring 336 to urge rotation of the drive part 324 and thus the spring holder 284 and lever 43 in the opposite direction, toward an operational position in which the tumbler assembly 161 is in the 1× position shown in FIG. 4.

Approximately halfway between its ends, the lever 43 has inclined surfaces 356 and 357 that are on opposite sides thereof, and that can respectively engage the inclined surfaces 277 and 278 provided on the arcuate flange 276 of the cover 256. A helical spring 361 has its upper end disposed within the blind opening 272. A cylindrical pin 362 is disposed in the opening 273, and cooperates with the upper end of the spring 361 in order to retain the spring in the opening 272. The lower end of the spring 361 is fixedly coupled to the base 16 (FIGS. 1-2) by another pin that is not visible in the drawings. The spring 361 is an expansion spring that resiliently pulls the module 41 downwardly toward the base 16, and thus resiliently urges the optics unit 17 to pivot downwardly about the pivot axis 22 relative to the base 16.

A screw 366 extends through an annular gasket 367, and engages the threaded opening 267 provided through the cover 256. After the optics unit 17 has been assembled, the opening 267 can be used to fill the interior of the optics unit 17 with dry air or an inert gas, in order to remove moist air that could potentially cause undesirable condensation on optical parts in cold temperatures. After the interior of the optics unit 17 has been filled with dry air, the screw 366 and gasket 367 are used to seal the opening 267.

FIG. 9 shows the lever 43 in a position corresponding to the 4× position of the tumbler assembly 161 (FIG. 8). To move the tumbler assembly 161 to the 1× position (FIG. 4), the lever 43 is first moved slightly counterclockwise in FIG. 9 about the axis 293, in order to separate the inclined surfaces 277 and 357. Then the lever 43 is pulled downwardly a short distance against the urging of the spring 317, and is pivoted clockwise in FIG. 9 about the axis 293. During this clockwise movement, the coil springs 321 and 322 will keep the tab 328 centered within the arcuate recess 297, so that there is no relative rotational movement between the spring holder 284 and the drive part 324. The lever 43 thus rotates the spring holder 284, which in turn through the springs 321-322 and tab 328 rotate the drive part 324, and the square protrusion 251 on the drive part rotates the tumbler assembly 161 from the 4× position of FIG. 8 toward the 1× position of FIG. 4. This movement occurs against the urging of the coil spring 336, and serves to increase the tension in the coil spring 336.

Before the lever 43 passes the right end of the arcuate flange 276 in FIG. 9, the stop plate 224 of the tumbler assembly of 161 engages the setscrew 222 (FIG. 4), thereby stopping pivotal movement of the tumbler assembly in the desired position, and preventing the tumbler assembly from moving past this position. Since the drive part 324 is directly coupled to the tumbler assembly 161, the drive part is also held against further movement. As the lever 43 is then manually moved slightly further in the clockwise direction in FIG. 9, the spring holder 284 moves even though the drive part 324 cannot move, and so the coil spring 321 is compressed between the tab 328 and an end of the arcuate recess 297. Once the lever 43 is beyond the end of the flange 276, the lever is manually moved upwardly, assisted by the coil spring 317, and then is released. The urging of the coil spring 321 moves the lever slightly counterclockwise in FIG. 9 so that the inclined surfaces 357 and 278 come into engagement. The lever 43 and spring holder 284 are still about 3° to 5° past the position in which the drive part 324 and tumbler assembly 161 stopped moving, and so the coil spring 321 is still somewhat compressed, and continues to urge the lever 43 to pivot counterclockwise, thereby urging the inclined surfaces 357 and 278 against each other.

The inclination of the surfaces 357 and 278 is such that, when they are urged together by the spring 321, they resist downward movement of the lever 43. The coil spring 317 also resists downward movement of the lever 43. Consequently, the lever 43 is reliably held against movement out of this position, and the optics are reliably maintained in the selected position. If for some reason the lever 43 is inadvertently bumped with sufficient force to move it downwardly until the surfaces 357 and 278 becomes disengaged, the coil spring 336 will automatically pivot the lever 43 counterclockwise in FIG. 9 to its original position, so that the tumbler assembly 161 is returned to its 4× position of FIG. 8. Of course, as mentioned earlier, it would alternatively be possible for the coil spring 336 to urge rotation of the drive part 324 and thus the spring holder 284 and lever 43 in the opposite direction, toward an operational position in which the tumbler assembly 161 is in the 1× position shown in FIG. 4.

Assume for sake of discussion that the lever 43 is not bumped so as to cause an inadvertent release. In order to return the optics from the 1× position to the 4× position, the lever 43 is manually pulled clockwise a short distance about the axis 293 in FIG. 9 to separate the inclined surfaces 357 and 278, which slightly further compresses the spring 321. Then the lever 43 is pulled downwardly a small distance against the urging of the spring 317 until the lever is capable of pivoting counterclockwise without engaging the flange 276. The lever 43 is then manually pivoted counterclockwise in FIG. 9 about the axis 293, assisted by the urging of the coil spring 336. During this movement, before the lever 43 passes the opposite end of the flange 276, the surface 231 (FIG. 8) on the tumbler housing 163 will engage the limit surface 232 on the cartridge frame 53, thereby preventing further pivotal movement of the tumbler assembly 161 past the 4× position shown in FIG. 8, which in turn prevents further pivotal movement of the drive part 324. As the lever 43 is then manually pivoted further in the clockwise direction in FIG. 9, the drive part 324 cannot move but the spring holder 284 will move, thereby compressing the coil spring 322 between the tab 328 and an end of the arcuate recess 297. The lever 43 is then moved upwardly and released, and the coil spring 322 moves the lever 43 a short distance in the clockwise direction in FIG. 9 until the inclined surfaces 356 and 277 are in engagement. The lever 43 and spring holder 284 are still about 3° to 5° past the position in which the drive part 324 and tumbler assembly 161 stopped moving, and so the coil spring 322 is still somewhat compressed, and continues to urge the lever 43 to pivot clockwise, thereby urging the inclined surfaces 356 and 277 against each other. The inclination of the surfaces 356 and 277 is such that, when they are urged together by the coil spring 322, they resist downward movement of the lever 43. The coil spring 317 also yieldably resists downward movement of the lever 42.

Although a selected embodiment has been illustrated and described in detail, it should be understood that a variety of substitutions and alterations are possible without departing from the spirit and scope of the present invention, as defined by the claims that follow.

What is claimed is:

1. An apparatus comprising an optical sight that includes:
   first and second sections, said second section being movable between spaced first and second positions relative to said first section;
   limit structure that prevents movement of said second section away from said first position past said second position;
   optics supported on said second section, said sight operating optically in first and second operational modes that are different when said second section is respectively in said first and second positions;
   a member movable relative to said first section from a third position through a fourth position to a fifth position;
   coupling structure operatively coupling said member to said second section so that as said member moves from said third position to said fourth position said coupling structure moves said second section from said first position to said second position, and so that when said member is on a side of said fourth position remote from said third position said coupling structure resiliently urges said second section toward said limit structure; and
   retaining structure that can releasably retain said member in a position on a side of said fourth position remote from said third position.

2. An apparatus according to claim 1, including resilient structure that yieldably urges movement of said member from said fourth position to said third position relative to said first section.

3. An apparatus according to claim 1, including an assembly that is detachably mounted on said first section, and that includes said member, said coupling structure, and said retaining structure.

4. An apparatus according to claim 3,
   wherein said coupling structure includes a movable drive part; and
   wherein one of said second section and said drive part has a protrusion thereon and the other thereof has a recess therein that removably receives said protrusion when said assembly is detachably mounted on said first section.

5. An apparatus according to claim 1,
   wherein said coupling structure includes a resilient element operatively disposed between said member and said second section; and
   wherein as said member moves from said third position to said fourth position said member moves said resilient element and said resilient element moves said second section from said first position to said second position, said resilient element being compressed when said member is on a side of said fourth position remote from said third position while said second section is maintained in said second position by said limit structure.

6. An apparatus according to claim 1,
   wherein said member moves from said fourth position to said fifth position in a first direction; and
   wherein said retaining structure includes said member being movable from said fifth position to a sixth position in a second direction transverse to said first direction, and includes first and second surface portions that are respectively provided on said member and said first section and that face and engage each other when said member is in said sixth position so as to obstruct movement of said member opposite said first direction relative to said first section.

7. An apparatus according to claim 6, wherein said second surface portion is inclined with respect to said first direction.

8. An apparatus according to claim 1,
   wherein said limit structure prevents movement of said second section away from said second position past said first position;
   wherein said member is movable relative to said first section away from said fourth position through said third position to a sixth position;
   wherein as said member moves from said fourth position to said third position said coupling structure moves said second section from said second position to said first position, and when said member is on a side of said third position remote from said fourth position said coupling structure resiliently urges said second section away from said second position past said first position toward said limit structure; and
   wherein said retaining structure can releasably retain said member in a position on a side of said third position remote from said fourth position.

9. An apparatus according to claim 8,
wherein said coupling structure includes first and second resilient elements operatively disposed between said member and said second section;
wherein as said member moves from said third position to said fourth position said member moves said first resilient element and said first resilient element moves said second section from said first position to said second position, said first resilient element being compressed when said member is on a side of said fourth position remote from said third position while said second section is maintained in said second position by said limit structure; and
wherein as said member moves from said fourth position to said third position said member moves said second resilient element and said second resilient element moves said second section from said second position to said first position, said second resilient element being compressed when said member is on a side of said third position remote from said fourth position while said second section is maintained in said first position by said limit structure.

10. An apparatus according to claim 8,
wherein said member moves from said fourth position to said fifth position in a first direction;
wherein said retaining structure includes said member being movable from said fifth position to a seventh position in a second direction transverse to said first direction, and being movable from said sixth position to an eighth position in a third direction transverse to said first direction; and
wherein said retaining structure includes first and second surface portions that are respectively provided on said member and said first section and that face and engage each other when said member is in said seventh position so as to obstruct movement of said member opposite said first direction relative to said first section, and includes third and fourth second surface portions that are respectively provided on said member and said first section and that face and engage each other when said member is in said eighth position so as to obstruct movement of said member in said first direction relative to said first section.

11. An apparatus according to claim 10, wherein said second and fourth surface portions are each inclined with respect to said first direction.

12. An apparatus according to claim 1, wherein in said first and second operational modes said sight provides respective first and second levels of optical magnification that are different.

13. A method of operating an optical sight that includes a first section, and a second section with optics thereon, comprising:
supporting said second section for movement between spaced first and second positions relative to said first section, said sight operating optically in first and second operational modes that are different when said second section is respectively in said first and second positions;
preventing movement of said second section away from said first position past said second position;

supporting a member for movement relative to said first section from a third position through a fourth position to a fifth position;
responding to movement of said member from said third position to said fourth position by moving said second section from said first position to said second position;
resiliently urging said second section to move away from said first position past said second position when said member is on a side of said fourth position remote from said third position; and
releasably retaining said member in a position on a side of said fourth position remote from said third position.

14. A method according to claim 13, including yieldably urging movement of said member from said fourth position to said third position relative to said first section.

15. A method according to claim 13, wherein said supporting of said member includes supporting said member for movement relative to said first section away from said fourth position through said third position to a sixth position, and including:
preventing movement of said second section away from said second position past said first position;
responding to movement of said member from said fourth position to said third position by moving said second section from said second position to said first position;
resiliently urging said second section to move away from said second position past said first position when said member is on a side of said third position remote from said fourth position; and
releasably retaining said member in a position on a side of said third position remote from said fourth position.

16. An apparatus comprising an optical sight that includes:
first and second sections, said second section being movable between spaced first and second positions relative to said first section;
optics supported on said second section, said sight operating optically in first and second operational modes that are different when said second section is respectively in said first and second positions; and
an assembly fixedly detachably mounted on said first section, said assembly including:
a member movable relative to said first section from a third position to a fourth position;
coupling structure operatively coupling said member to said second section so that as said member moves from said third position to said fourth position said coupling structure moves said second section from said first position to said second position; and
retaining structure cooperable with said member after said member has reached said fourth position to releasably retain said member against movement toward said third position.

17. An apparatus according to claim 16,
wherein said coupling structure includes a movable drive part, movement of said member causing movement of said drive part; and
wherein one of said second section and said drive part has a protrusion thereon and the other thereof has a recess therein that removably receives said protrusion when said assembly is detachably mounted on said first section, cooperation between said protrusion and said recess causing said second section to be moved in response to movement of said drive part.

18. An apparatus comprising an optical sight that includes:

first and second sections, said second section being movable between spaced first and second positions relative to said first section;

optics supported on said second section, said sight operating optically in first and second operational modes that are different when said second section is respectively in said first and second positions;

a member movable relative to said first section from a third position to a fourth position;

coupling structure operatively coupling said member to said second section so that as said member moves from said third position to said fourth position said coupling structure moves said second section from said first position to said second position;

retaining structure cooperable with said member after said member has reached said fourth position to releasably retain said member against movement toward said third position; and resilient structure that yieldably urges movement of said member from said fourth position to said third position relative to said first section.

* * * * *